United States Patent

[11] 3,555,270

| [72] | Inventor | Erik Persson |
| | | Vasteras, Sweden |
| [21] | Appl. No. | 723,060 |
| [22] | Filed | Apr. 22, 1968 |
| [45] | Patented | Jan. 12, 1971 |
| [73] | Assignee | Allmanna Svenska Elektriska Aktiebolaget |
| | | Vasteras, Sweden |
| | | a Swedish corporation |
| [32] | Priority | Apr. 26, 1967 |
| [33] | | Sweden |
| [31] | | 5866/67 |

[54] RAIL SIGNAL DISTURBANCE AVOIDANCE MEANS
4 Claims, 4 Drawing Figs.

| [52] | U.S. Cl. | 246/194 |
| [51] | Int. Cl. | B61l 3/00 |
| [50] | Field of Search | 336/119, 129; 246/182, 63, I, C, 187, A, 13, 194, 8, 63, 63C |

[56] References Cited
UNITED STATES PATENTS

| 2,662,934 | 12/1953 | Allison | 246/194X |
| 1,655,006 | 1/1928 | Zierdt | 246/63(C) |
| 1,900,412 | 3/1933 | Bossart | 246/8X |

FOREIGN PATENTS

| 1,122,796 | 5/1956 | France | 246/63 |

Primary Examiner—Arthur L. La Point
Assistant Examiner—George H. Libman
Attorney—Jennings Bailey, Jr.

ABSTRACT: In electrically operated rail vehicles in which signals are inductively transmitted from rails to vehicle through coils applied in the vehicle, disturbances are avoided by pivoting said coil (preferably series-connected) to such an angle in relation to the plane of the rails that the resultant voltage from an asymmetrical current conductor is very low or zero. The same effect could also be accomplished by placing said coils horizontally and supplementing them by transverse coils.

PATENTED JAN 12 1971          3,555,270

INVENTOR.
ERIK PERSSON
BY
Jennings Bailey, Jr.

3,555,270

RAIL SIGNAL DISTURBANCE AVOIDANCE MEANS

BACKGROUND OF THE INVENTION

1. Field of the Invention

The present invention relates to a means for avoiding disturbances in the signal systems for electrically operated rail vehicles in which signals are inductively transmitted from rails to vehicle through coils applied in the vehicle.

2. Description of the Prior Art

For signal transmission to railway vehicles, such as underground trains, the speed, for example is regulated by signals in the form of a modulated carrier frequency, for example 75 cycles, and these alternating currents are conducted in the pair of rails in opposite directions. Particularly in the range around 75 cycles, undesired disturbances are obtained in the form of harmonics from driving equipment, current supply equipment, or the like, but such disturbances may also occur at other frequency ranges. Such disturbing currents are often equally distributed over the two rails and as long as these currents have the same direction and level in the two rails, it is possible by disconnecting the customary receiver coils in the vehicle to eliminate their influence. However, it is difficult to eliminate the influence from an asymmetrically placed live rail or conductor, which may cause erroneous signals in the vehicle.

SUMMARY OF THE INVENTION

The invention aims at a solution of these and other similar problems and is characterized in that the coils are pivoted or pivotable at such an angle in relation to the plane of the rails that currents in an asymmetrically placed live rail or conductor do not induce any resultant voltage in the coils or considerably reduce these voltages. By a suitable choice of angle it is possible to obtain oppositely directed voltages of equal magnitude to the two coils, while the desired signals are not influenced to any great extent.

A modification of the invention provides approximately the same effect and is characterized in that the coils are placed horizontally and are supplemented by transverse coils, the combined arrangement providing an effect corresponding to a sloping coil.

BRIEF DESCRIPTION OF THE DRAWINGS

The invention is further exemplified in the accompanying drawings in which.

DESCRIPTION OF THE PREFERRED EMBODIMENTS

Figure 4:
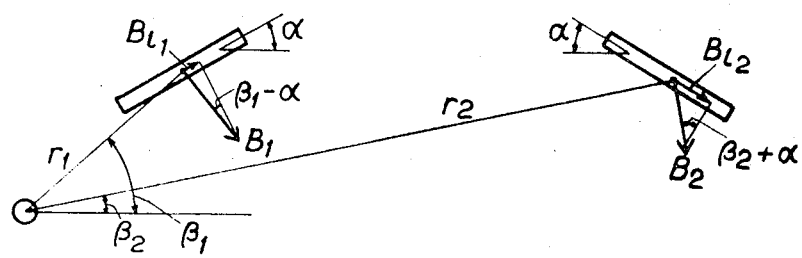

FIG. 4 shows in principle a current conductor S with current I. The voltage induced in the coils 1 and 2 is proportional to the flux density component in the longitudinal direction of the coil $B_{1_1}$ and $B_{1_2}$ respectively. The angle to the horizontal plane for radii $r_1$ and $r_2$, respectively, drawn between the current conductor and the coils is $\beta_1$ and $\beta_2$, respectively, and $\alpha$ is the turning angle of the coil in relation to the horizontal plane. The following is then obtained:

$$B_{1_1} = \frac{k \cdot I}{r_1} \cdot \sin(\beta_1 - \alpha)$$

$$B_{1_2} = \frac{k \cdot I}{r_2} \cdot \sin(\beta_2 + \alpha)$$

$$B_{res} = B_{1_1} - B_{1_2} = k \cdot I \frac{\sin(\beta_1 - \alpha)}{r_1} - \frac{\sin(\beta_2 + \alpha)}{r_2}$$

A new value is thus found for $\alpha$, at which the difference $B_{1_1} - B_{1_2} = 0$. The coils are oppositely connected. However, due to the occurrence of iron in the flux paths it may be suitable to somewhat adjust the above obtained $\alpha$, but the angle for both coils is the same since the current conductor may also lie on the opposite side of the vehicle from that shown, often alternating along the same track.

Figure 1:
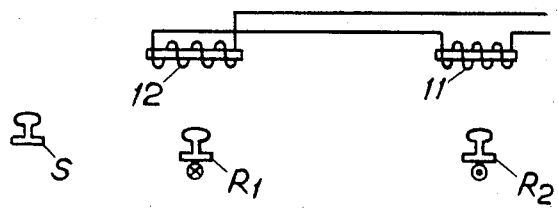
FIG. 1 shows previously known equipment and FIG. 2 equipment according to the invention.

FIG. 1 shows the technical situation with two horizontal coils 11, 12, that is $\alpha = 0$. The coils are counterconnected. The signal current flows in the rails $R_1$ and $R_2$ in opposite directions, and the desired signal will thus be equal to the sum of the voltages induced in 11 and 12. Disturbances due to harmonics in the driving currents in the rails are in principle eliminated by counterconnection as long as the current is distributed equally over the two rails $R_1$, $R_2$. With asymmetrically situated current conductors, which is normal, harmonics in the currents flowing in these will produce undesired disturbances signals in the signal circuit, which is clear from the above.

Figure 2:
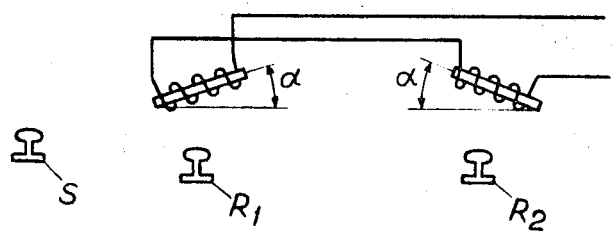

In the arrangement according to FIG. 2 this problem is solved. Here the two coils 13, 14 have been placed at a certain angle $\alpha$ to the horizontal plane and the above-mentioned minimum has been achieved, that is, the disturbances have been completely or partially eliminated. The angle $\alpha$ is the same for 13 and 14 but in certain cases it can be made different. The current conductor S is placed to the left in the drawings.

Figure 3:
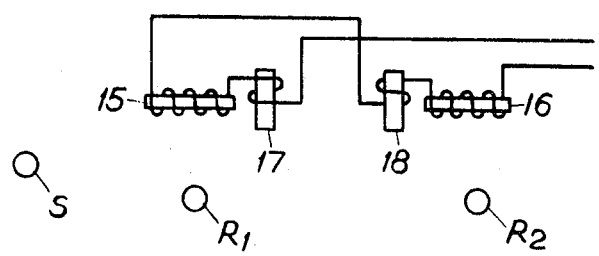
FIG. 3 shows a modification of the equipment according to the invention and FIG. 4 finally shows the principle of the interference protection.

FIG. 3 shows a modification of the invention with two horizontal main coils 15, 16, each with its own transverse coil 17, 18 with the axis running perpendicular or at some other angle to the main coils 15, 17. These transverse coils 17, 18 may be placed beside or in the main coils and the whole coil arrangement should be placed above the respective rails $R_1$, $R_2$, but this is not entirely necessary. The coils according to FIG. 3 may also be combined to one unit (not shown).

The device according to the above can be varied within the scope of the following claims.

I claim:

1. Means for avoiding disturbances in the signal systems for electrically operated rail vehicles in which signals are inductively transmitted from rails to the vehicle through coils mounted in the vehicle, all said coils being positioned at an angle in relation to the plane of the rails of such a magnitude that currents in an asymmetrically placed current conductor do not induce any substantial resultant voltage in the coils.

2. Means according to claim 1 in which said coils are series-connected.

3. Means for avoiding disturbances in the signal system for electrically operated rail vehicles in which signals are inductively transmitted from rails to the vehicles through two main coils mounted in the vehicle, said coils being placed horizontally and two supplementary coils positioned at an angle to the horizontal plane in series with the main coils, said coils being arranged in two groups, each group comprising a main coil and an angularly positioned coil series-connected to each other.

4. Means according to claim 3 in which all said coils are series-connected.